United States Patent [19]

McClellan

[11] Patent Number: 4,744,168
[45] Date of Patent: May 17, 1988

[54] ARTIFICIAL FISHING LURE
[75] Inventor: Bingham A. McClellan, Traverse City, Mich.
[73] Assignee: McClellan Industries, Inc., Traverse City, Mich.
[21] Appl. No.: 884,551
[22] Filed: Jul. 11, 1986
[51] Int. Cl.⁴ .............................................. A01K 85/00
[52] U.S. Cl. .................................. 43/42.24; 43/42.36
[58] Field of Search ................ 43/42.24, 42.36, 42.28, 43/42.37, 42.38, 42.1

[56] References Cited

U.S. PATENT DOCUMENTS

| | | | |
|---|---|---|---|
| 1,701,528 | 2/1929 | Clewell | 43/42.24 |
| 2,136,713 | 11/1938 | Schnabel | 43/42.36 |
| 2,690,026 | 9/1954 | King | 43/42.24 |
| 3,120,074 | 2/1964 | Messler | 43/42.36 |
| 3,426,467 | 2/1969 | Bryant | 43/42.36 |
| 3,724,116 | 4/1973 | Lindner | 43/42.24 |
| 3,978,606 | 9/1976 | Riggs | 43/42.24 |
| 4,094,087 | 6/1978 | Carpenter | 43/42.24 |

Primary Examiner—Kurt Rowan
Attorney, Agent, or Firm—Charles M. Kaplan

[57] ABSTRACT

A multi-part artificial fish lure has a flexible worm that has been Texas-rigged on a hook, with the eye of the hook extending ahead of the worm. A flexible, resilient floating head has a central longitudinal hole through which the fishing line passes before being tied to the hook eye. The eye is much wider than the hole in the floating head; when the eye is forced into the hole, the inherent resilience of the material from which the head is made causes the inside surface of the hole to tightly grip the hook eye and thereby to hold the parts of the lure in their proper fish attracting relative positions and to prevent the parts from separating.

11 Claims, 1 Drawing Sheet

U.S. Patent  May 17, 1988  4,744,168
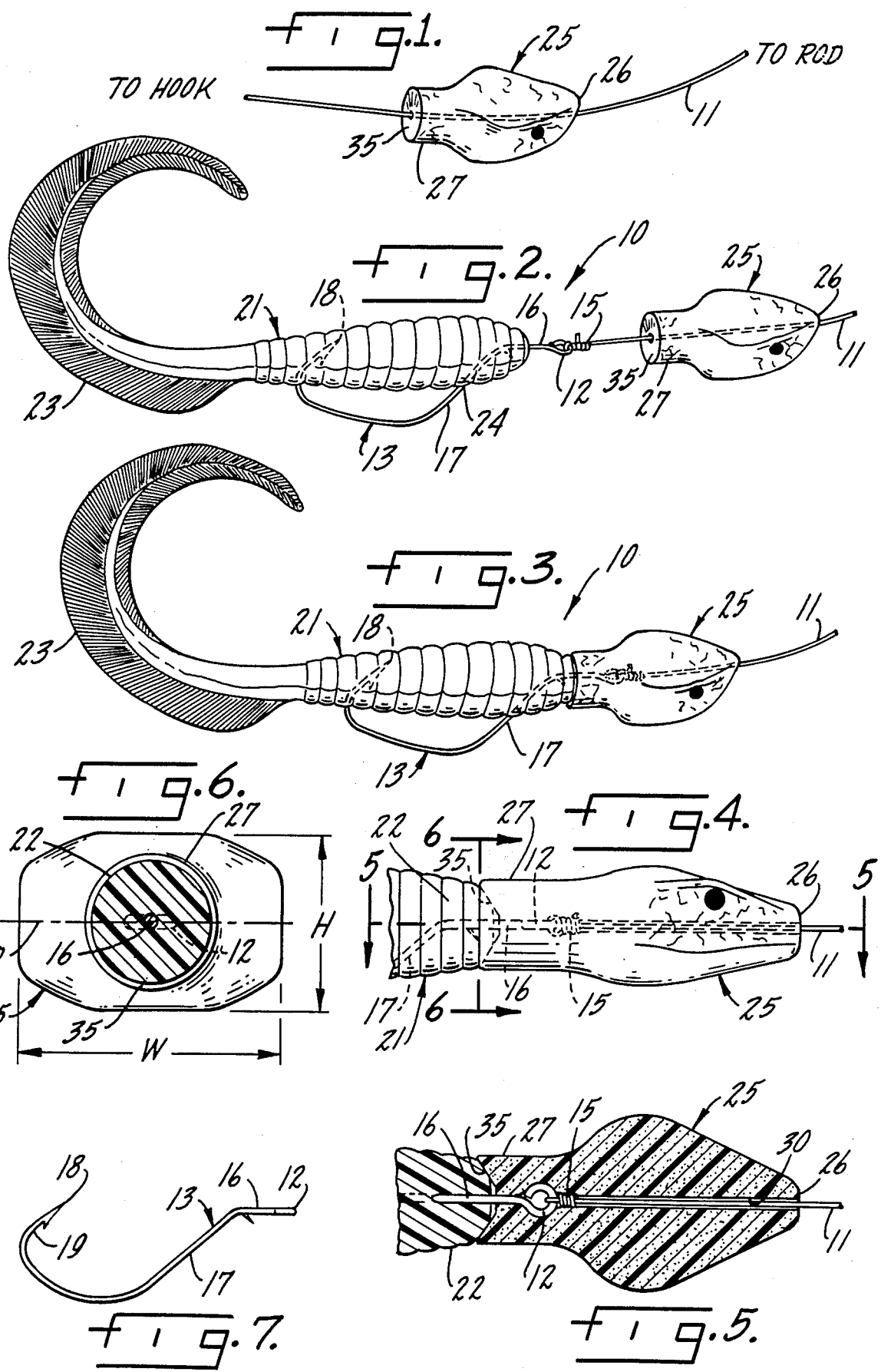

ARTIFICIAL FISHING LURE

BACKGROUND OF THE INVENTION

Often fish can be caught easily by artificial lures that resemble the live creatures upon which the fish feed. Small snakes are eaten by many species of fish but are almost impossible to obtain as live bait. Also, fish are believed to sometimes attack snakes as the result of a conditioned reflex to protect their territory. Prior artificial baits that were intended to resemble snakes were not often successful because as they were retrieved through the water their action was not similar enough to that of a snake.

OBJECTIVES OF THE INVENTION

Accordingly, it is an object of my invention to provide an improved fishing lure.

Another object is to provide a soft bodied weedless fishing lure.

Another object is to provide a floating fishing lure that resembles a live creature swimming at the surface of the water.

Another object is to provide a floating head for a fishing lure that permits the parts of the lure to be changed easily.

Another object is to provide a multi-part, soft bodied, weedless fishing lure that resembles a swimming snake, and is durable, easy to cast or troll, highly attractive to fish, relatively inexpensive, and which does not possess defects found in similar prior art fishing lures.

Other objects and advantages of my invention will be found in the specification and claims, and the scope of the invention will be set forth in the claims.

DESCRIPTION OF THE DRAWING

FIG. 1 is a perspective view of a floating head in accord with the invention.

FIG. 2 is a perspective view of a fish lure in accord with the invention with the head separated from the tail.

FIG. 3 is a perspective view of the invention.

FIG. 4 is an enlarged, partially broken-away view of the invention.

FIG. 5 is a cross sectional view taken along the line 5—5 in FIG. 4.

FIG. 6 is an enlarged cross sectional view taken along the line 6—6 in FIG. 4.

FIG. 7 is a side view of the fish hook shown in FIGS. 2-6.

DESCRIPTION OF THE INVENTION

The drawing shows a multi-part, floating, artificial fishing lure 10 attached to a fishing line 11 having a predetermined diameter (e.g. 0.025 inches). The line is tied to the eye 12 of a hook 13 by any conventional knot 15. Hook 13 has a straight shank portion 16 extending from eye 12 to a curved shank portion 17 that terminates in a point 18 at barbed end 19. The combined length of straight shank portion 16 and eye 12 preferably should be at least about twenty percent of the length of hook 13, and the distance from the point 18 to the shank should be less than about one-half of the total length of the hook. Shank portion 16 has a predetermined diameter, preferably in the range of about 0.03–0.08 inches. The width of eye 12, as shown in FIG. 5, should be several times greater than the diameter of the hook shank, and preferably the eye width should be in the range of about 0.012–0.25 inches. When the parts of fish lure 10 are properly assembled as shown, eye 12 and shank portion 16 are in the same horizontal plane 20.

Fish lure 10 includes a flexible synthetic plastic eel or worm 21 having a front end 22 and a tail end 23. The pointed end 19 of the hook has been passed through the front end 22 of worm 21, then out through the body of the worm at 24, and then point 18 has been buried or reinserted into the body of the worm adjacent its front end 22 to provide the classic Texas-rigged weedless worm. Eye 12 and at least a part of straight shank portion 16 protrude from the worm ahead of its front end 22.

A floating head 25 has a front end 26 and a rear end 27, and may be shaped to resemble the head of a live creature such as a snake. Floating head 25 should be made from soft, closed-cell, resilient, synthetic foam, such as polyvinyl chloride, or urathane, and such foam should have a specific gravity less than one. Floating head 25 has an interior passageway, such as cylindrical hole 30, passing longitudinally from end to end through its center. The width or diamter of hole 30 must be larger than the diamter of line 11 but smaller than the width of eye 12, and preferably should be in the range of about 0.04–0.08 inches. The width W of floating head 30 should be greater than its thickness or height H, and preferably the width should be at least about fifty percent more than the height. A spherical or conical indentation 35 is defined at rear end 27, and hole 30 is centered in the indentation.

To assemble lure 10, fish line 11 is passed through hole 30 ahead of hook 13 before tying knot 15. Then the knot is tied and worm 21 is Texas-rigged on hook 13 as previously described. Eye 12 and the protruding part of shank portion 16 are then forced into hole 30 from the rear of floating head 25. As shown in FIG. 5, the interior of head 25 is deformed around eye 12 and the inside surface of hole 30 grips eye 12 so as to hold the head in the proper orientation with respect to worm 21. The tip of the front end 22 of worm 21 extends into indentation 35. Hook eye 12 should be aligned or adjusted so that it is in horizontal plane 20 with the widest part of eye 12 aligned or parallel with the wide part of floating head 25, as shown in FIGS. 5 and 6. This will locate most of the curved shank portion 17 of hook 13 below plane 20. With a major part of hook 13 below plane 20, the hook will act as a weighted keel that will maintain lure 10 in its most effective fish attracting position as shown.

It has thus been shown that by the practice of my invention, a multi-part fishing lure can be held together by using the inherent resilience of plastic head 25. The deformed material that defines the inside surface of hole 30 grips hook eye 12 and thus holds hook 13 and attached worm 21 in the position that ensures the proper swimming action of the lure. Also, it is not possible for head 25 to float along line 11 away from tail 21. Lure 10 is essentially weedless because knot 15 and eye 12 are protected inside of hole 30 and the tip of worm end 22 extends into indentation 35. Since lure 10, after assembly as described, presents the outline of a unitary body, any tendency of the lure to catch weeds or moss or to become fouled on obstacles in the water is minimized. If a different combination of floating heads, worms, or hooks is desired by the fisherman, the parts of lure 10 can be quickly and easily changed.

While the present invention has been described with reference to a particular embodiment, I do not intend to illustrate or describe herein all of the equivalent forms or ramifications thereof. For example, floating head 25 need not be shaped to resemble any natural creature, and hook 13 can have a conventional straight shank. Also, the words used are words of description rather than limitation, and various changes may be made without departing from the spirit or scope of my invention disclosed herein. It is intended that the appended claims cover all such changes as fall within the true spirit and scope of my invention.

What I claim as new and desire to secure by Letters Patent of the United States is:

1. An artificial fishing lure for attachment to a fishing line having a predetermined diameter, said lure comprising:
   (A) a fish hook having a curved portion ending in a barb, an eye and a straight shank portion of predetermined length extending from said eye toward said curved portion, said eye having a predetermined width, and said eye and said straight shank portion being in the same horizontal plane;
   (B) a flexible, synthetic plastic worm having a front end and a tail end, said worm being Texas-rigged on said hook such that said barb has been passed through and out of said front end and then been reinserted into the body of said worm adjacent said front end, said barb being imbedded and concealed with said worm, said hook eye and a part of said straight shank portion protruding ahead of said front end;
   (C) a floating head having a front end and rear end, said head being made from closed-cell, resilient synthetic plastic foam, said head being wider than it is thick and having an interior hole of predetermined width passing longitudinally there through, said width of said hole being larger than said diameter of said line but being substantially smaller than said width of said eye, said fishing line passing through said hole and being tied to said eye within said hole adjacent said rear end of said head, said eye and said protruding part of said shank portion being inserted into said hole so that said eye deforms the interior said head and is tightly gripped by the inside surface of said hole in said horizontal plane so as to prevent movement of said head, the widest dimension of said eye being aligned with the widest dimension of said head, and a major part of said curved portion of said hook being below said plane, said curved portion acting as a keel weight located below said worm for maintaining said lure in its fish attracting position.

2. The invention as defined in claim 1, further comprising said floating head having at its rear end an indentation in which said hole is centered, and said front end of said worm extends into said indentation.

3. The invention as defined in claim 1, wherein said width of said hole is in the range of about 0.04 to 0.08 inches.

4. The invention as defined in claim 1, wherein said width of said eye is in the range of about 0.12 to 0.25 inches.

5. The invention as defined in claim 1, wherein said floating head is at least about fifty percent wider than it is thick.

6. The invention as defined in claim 1, wherein said straight shank portion and said eye are at least about twenty percent of the length of said hook.

7. The invention as defined in claim 1, wherein said floating head is shaped like the head of a snake.

8. A floating artificial fishing lure for attachment to a fishing line having a predetermined diameter, said lure comprising:
   (A) a fish hook having a curved portion ending in a barb, an eye and a striaght shank portion of predetermined length extending from said eye toward said curved portion, siad eye having a predetermined width, and said eye and said straight shank portion being in the same plane;
   (B) a flexible, synthetic plastic worm having a front end and a tail end, said worm being Texas-rigged on said hook such that said barb has been passed through and out of said front end and then been reinserted into the body of said worm adjacent said front end, said barb being imbedded and concealed within said worm, said hook eye and a part of said straight shank portion protruding ahead of said front end;
   (C) a floating head having a front end and rear end, said head being made from resilient plastic, said head having an interior hole of predetermined width passing longitudinally there through, said width of said hole being larger than said diameter of said line but being substantially smaller than said width of said eye, said fishing line passing through said hole and being tied to said eye within said hole, said eye and said protruding part of said shank portion being inserted into said hole so that said eye deforms the interior said head and is tightly gripped by the inside surface of said hole in said plane so as to prevent movement of said head; and
   (D) a major part of said curved portion of said hook being located below said plane so that said curved portion of said hook acts as a keel weight located below said worm for maintaining said floating lure in its fish attracting position.

9. The invention as defined in claim 8, wherein said floating head is wider than it is thick.

10. The invention as defined in claim 9, wherein said floating head is at least about fifty percent wider than it is thick.

11. A floating, multi-part artificial fishing lure for attachment to a fishing line having a predetermined diameter, said lure comprising:
   (A) a fish hook having a curved shank portion ending in a barbed point, an eye, and a straight shank portion extending from said eye toward said curved portion, the combined length of said straight shank portion and said eye being at least about twenty percent of the length of said hook, and the distance from said point to the hook shank being less than about one half of the length of said hook, said eye having a predetermined width, and said eye and said straight shank portion being in the same horizontal plane;
   (B) a flexible synthetic plastic worm having a front end and a tail end, said worm being Texas-rigged on said hook such that said barb has been passed through and out of said front end and then been reinserted into the body of said worm adjacent said front end, said barb being imbedded and concealed within said worm, said hook eye and a part of said straight shank portion protruding ahead of said front end; and
   (C) a floating head having a front end and rear end, said head being made from soft, closed-cell, resilient synthetic plastic foam having a specific gravity less than one; said floating head being wider than it is thick and having an interior cylindrical hole of predetermined diameter passing longitudinally through its center, said diameter of said hole being larger than said diameter of said line but being substantially smaller than said width of said eye, said fishing line passing through said hole and being tied to said eye within said hole adjacent said rear end of said floating head, said eye and said protruding part of said shank portion being inserted into said hole so that said eye deforms the interior of said head and is tightly gripped at its widest part by the inside surface of said hole in said horizontal plane so as to prevent movement of said head, said widest part of said eye being aligned parallel to the widest dimension of said head, said head having at its rear end an indentation in which said hole is centered, and said front end of said worm extending into said indentation, a major part of said curved portion of said hook being below said plane, whereby, said curved portion of said hook acts as a keel weight located below said worm for maintaining said lure in its fish attracting position.

* * * * *

UNITED STATES PATENT AND TRADEMARK OFFICE
CERTIFICATE OF CORRECTION

PATENT NO. : 4,744,168

DATED : May 17, 1988

INVENTOR(S) : Bingham A. McClellan

It is certified that error appears in the above-identified patent and that said Letters Patent is hereby corrected as shown below:

Column 1, line 68, "0.012" should be --0.12--.

Column 3, line 27, "with" should be --within--.

Column 4, line 9, "siad" should be --said--.

Signed and Sealed this

Twentieth Day of September, 1988

Attest:

DONALD J. QUIGG

*Attesting Officer*     *Commissioner of Patents and Trademarks*